United States Patent
Allinson

(10) Patent No.: US 10,922,018 B2
(45) Date of Patent: Feb. 16, 2021

(54) SYSTEM AND METHOD FOR LATENCY AWARE DATA ACCESS

(71) Applicant: Oath Inc., New York, NY (US)

(72) Inventor: Ric Allinson, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 0 days.

(21) Appl. No.: 16/291,566

(22) Filed: Mar. 4, 2019

(65) Prior Publication Data

US 2020/0285414 A1    Sep. 10, 2020

(51) Int. Cl.
*G06F 3/06* (2006.01)
*G06F 12/0802* (2016.01)

(52) U.S. Cl.
CPC .......... *G06F 3/0659* (2013.01); *G06F 3/0611* (2013.01); *G06F 3/0653* (2013.01); *G06F 12/0802* (2013.01)

(58) Field of Classification Search
CPC .... G06F 3/0659; G06F 3/0611; G06F 3/0653; G06F 12/0802
See application file for complete search history.

(56) References Cited

U.S. PATENT DOCUMENTS

| | | | |
|---|---|---|---|
| 8,949,535 B1* | 2/2015 | Hunter | G06F 11/073 |
| | | | 711/119 |
| 2004/0186861 A1* | 9/2004 | Phatak | G06F 16/172 |
| 2017/0295246 A1* | 10/2017 | Georgiou | H04L 67/148 |
| 2017/0344484 A1* | 11/2017 | Pack, III | G06F 12/128 |
| 2019/0081884 A1* | 3/2019 | Spohn | H04L 41/12 |
| 2019/0102091 A1* | 4/2019 | Brown | G06F 3/0688 |
| 2019/0260845 A1* | 8/2019 | Shen | G06F 16/9574 |

* cited by examiner

*Primary Examiner* — Ryan Bertram
(74) *Attorney, Agent, or Firm* — Pillsbury Winthrop Shaw Pittman LLP

(57) ABSTRACT

The present teaching relates to a method, system, and programming for determining a source of a data object. A first average latency of a plurality of users in accessing the data object from the first data source is computed, wherein the first data source was previously identified as being the source of the data object. From each of other data sources, a second average latency of the plurality of users in accessing the data object from the other data source is obtained. In response to the first data source satisfying a first criterion associated with the first average latency, the first data source is maintained to be the source of the data object. In response to the first data source violating the first criterion, one of the other data sources that satisfies a second criterion associated with the second average latency is deemed as the source of the data object.

18 Claims, 13 Drawing Sheets

SYSTEM AND METHOD FOR LATENCY AWARE DATA ACCESS

BACKGROUND

1. Technical Field

The present teaching generally relates to a distributed data storage system. More specifically the present teaching relates to methods and systems for latency aware data access in a distributed data storage system.

2. Technical Background

Despite impressive advances in file system throughput resulting from technologies such as high-bandwidth networks and disk arrays, the file system latency has not improved, and in many cases has become worse. Consequently, file system I/O remains one of the major bottlenecks to operating system performance. Recent advances in high bandwidth devices have had a large impact on file system throughput. Unfortunately, access latency still remains a problem and is not likely to improve significantly due to the physical limitations of storage devices and network transfer latencies.

Traditional data-storage systems include a network of storage devices, wherein each storage device stores data in a persistent manner with guaranteed recoverability. Such storage devices are also referred to as persistent storage devices. In such a setting, when users intend to perform operations (e.g., read or update operations) on a particular data object, each user gains access to the particular data object only from the persistent storage device in which the data object resides. Specifically, regardless of the latency involved in the data-storage network (i.e., an amount of time required in retrieving the data object via the network), each user that intends to perform an operation with respect to the data object, issues a request to access the data object from the specific persistent storage device, and thereafter performs the intended operation(s). In doing so, the average latency of users that request access to the data object becomes very large, which in turn affects throughput performance.

Thus, there is a requirement for methods and systems that address the above stated limitations.

SUMMARY

The teachings disclosed herein relate to methods, systems, and programming for latency aware data access in a distributed data storage system.

One aspect of the present disclosure provides for a method, implemented on a machine having at least one processor, storage, and a communication platform capable of connecting to a network for determining a source of a data object. The method includes the steps of computing, with respect to a first data source, a first average latency of a plurality of users in accessing the data object from the first data source, wherein the first data source was previously identified as being the source of the data object; obtaining, from each of other data sources, a second average latency of the plurality of users in accessing the data object from the other data source; in response to the first data source satisfying a first criterion associated with the first average latency, maintaining the first data source to be the source of the data object; and in response to the first data source violating the first criterion, determining one of the other data sources that satisfies a second criterion associated with the second average latency to be the source of the data object.

By one aspect of the present disclosure, there is provided a system for determining a source of a data object. The system includes at least one processor configured for: computing, with respect to a first data source, a first average latency of a plurality of users in accessing the data object from the first data source, wherein the first data source was previously identified as being the source of the data object; obtaining, from each of other data sources, a second average latency of the plurality of users in accessing the data object from the other data source; in response to the first data source satisfying a first criterion associated with the first average latency, maintaining the first data source to be the source of the data object; and in response to the first data source violating the first criterion, determining one of the other data sources that satisfies a second criterion associated with the second average latency to be the source of the data object.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a machine-readable, non-transitory and tangible medium having data recorded thereon for determining a source of a data object. The medium executes a method including the steps of: computing, with respect to a first data source, a first average latency of a plurality of users in accessing the data object from the first data source, wherein the first data source was previously identified as being the source of the data object; obtaining, from each of other data sources, a second average latency of the plurality of users in accessing the data object from the other data source; in response to the first data source satisfying a first criterion associated with the first average latency, maintaining the first data source to be the source of the data object; and in response to the first data source violating the first criterion, determining one of the other data sources that satisfies a second criterion associated with the second average latency to be the source of the data object.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
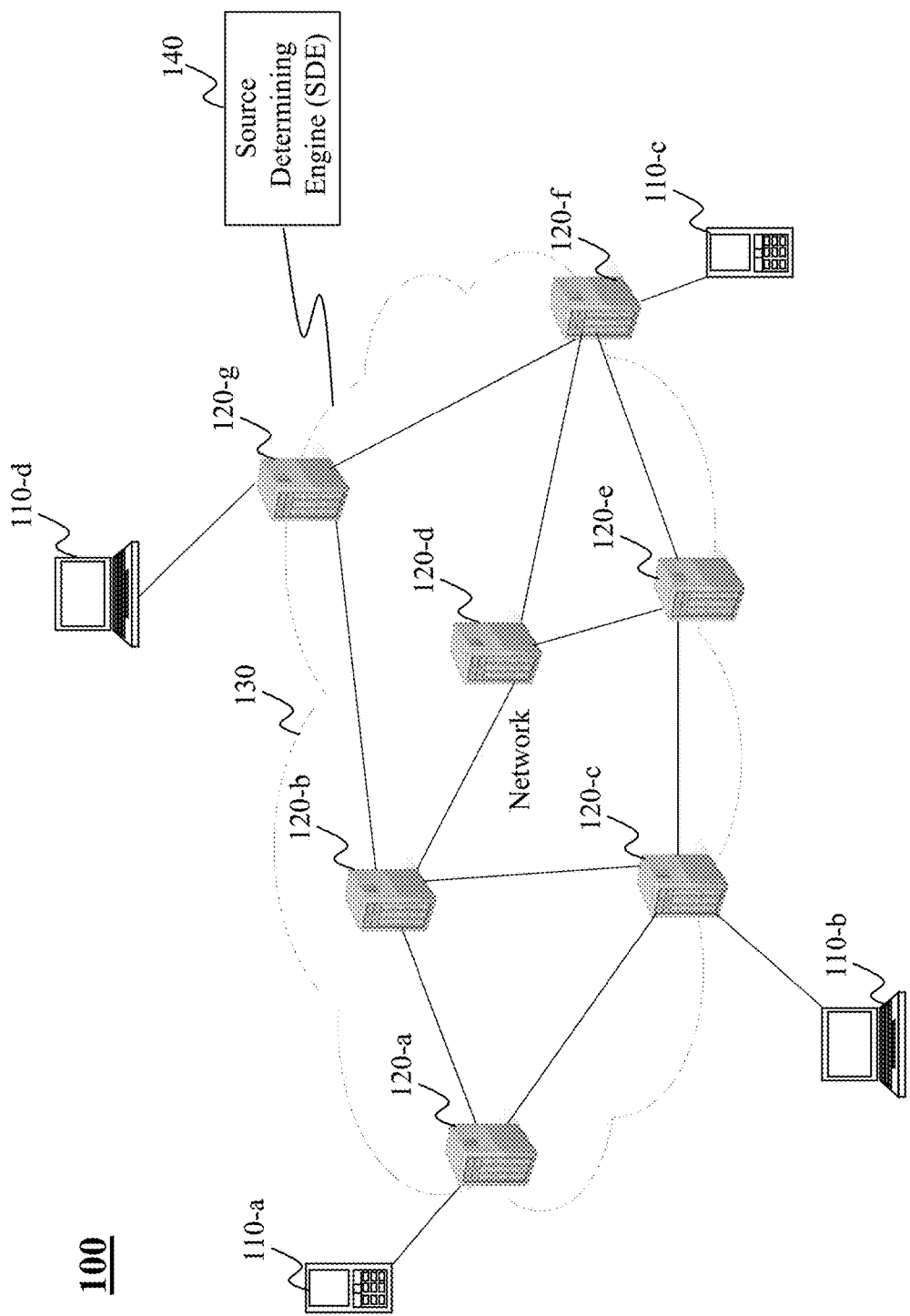
FIG. 1 depicts an operational configuration of a source determining engine in a network setting, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As stated previously, in a traditional data access network, which includes a plurality of storage devices connected in a mesh like form, users gain access to a specific data object by issuing a request to the specific storage device where the data object resides. More specifically, each data object is associated with a predetermined storage device, and requests issued from users across the network to gain access to the data object are always directed to the predetermined storage device. In such a setting, the average latency experienced by the users may be very large, and thus performance of the traditional data access networks may degrade.

Accordingly, embodiments of the present teaching provide for a source determining engine (SDE) that may be implemented in a centralized or distributed manner in a network of persistent storage devices. By one embodiment, the SDE is configured to dynamically determine for each data object, a persistent storage device to which all user requests to access the data object should be directed to based on certain criteria. The dynamically determined persistent storage device is also referred to herein after as a 'source of truth' storage device with respect to the data object. Thus, in contrast to traditional data access networks, wherein the access location for each data object is fixed (i.e., the predetermined storage device), the SDE of the present teaching dynamically determines the access location for each data object based on certain criteria as described below.

Moreover, it must be appreciated that in the following description, the functionalities of the SDE of the present teachings are described with respect to accessing data objects residing in the persistent storage devices across the network. However, this is in no way limiting the scope of the present disclosure. Rather, the concepts described herein are equally applicable to other scenarios, which require directing (i.e., allocating) a user's request to a host (e.g. server) of a plurality of hosts. Such applications may correspond to downloading of webpages from servers, scheduling requests in a radio access networks, telecom networks etc.

Turning now to FIG. 1, there is depicted an operational configuration 100 of a source determining engine in a network setting, according to an embodiment of the present teaching. As shown in FIG. 1, the exemplary configuration includes users 110-a, 110-b, 110-c, 110-d, a network 130 that includes a plurality of persistent storage devices 120-a, 120-b, . . . 120-g, and a source determining engine (SDE) 140. The persistent storage devices 120-a, 120-b, . . . 120-g are connected via network links to one another in a mesh-like form. In this illustrated embodiment, the SDE 140 is directly connected to the network 130 and operates as an independent service engine that determines, for each data object, a persistent data storage device that is a source of truth with respect to the data object.

The network 130 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a Bluetooth network, a virtual network, or any combination thereof. The network 130 may also include various network access points, e.g., wired or wireless access points such as base stations or Internet exchange points (not shown) through which a user may connect to the network 130 in order to transmit/receive information via the network.

The users 110-a, 110-b, 110-c, 110-d may be of different types such as ones connected to the network via wired or wireless connections via a device such as a desktop, a laptop, a handheld device, a built-in device embedded in a vehicle such as a motor vehicle, or wearable devices (e.g., glasses, wrist watch, etc.). In one embodiment, users 110-a, 110-b, 110-c, 110-d may be connected to the network 130 to access and interact with online content, via wired or wireless means, through related operating systems and/or interfaces implemented within the relevant user interfaces. The users via their respective devices 110-a, 110-b, 110-c, 110-d may issue requests to access data objects (in order to perform operations such as read, write, update the data objects) stored in the persistent storage devices.

According to one embodiment of the present teaching, for each request issued by a user to access a data object in a persistent storage device, the SDE 140 determines, based on certain criteria, whether the persistent storage device is the source of truth with respect to the data object. In other words, the SDE 140 determines whether the data object should be accessed from the persistent storage device, or whether the user should gain access to the data object from another persistent storage device. By one embodiment, the SDE 140 determines the source of truth for a particular data object based on access patterns of other users with respect to the data object. Specifically, the SDE 140 determines by one embodiment, whether a particular persistent storage device should be the source of truth with respect to the data object based on a comparison of average user latency with respect to the persistent storage device to the average user latency with respect to another persistent storage device. In one example, the SDE determines the source of truth to correspond to the persistent storage device that has a lowest (i.e., minimum) average user latency. Details regarding the operation of the SDE are described next with reference to FIG. 3.

Figure 2:
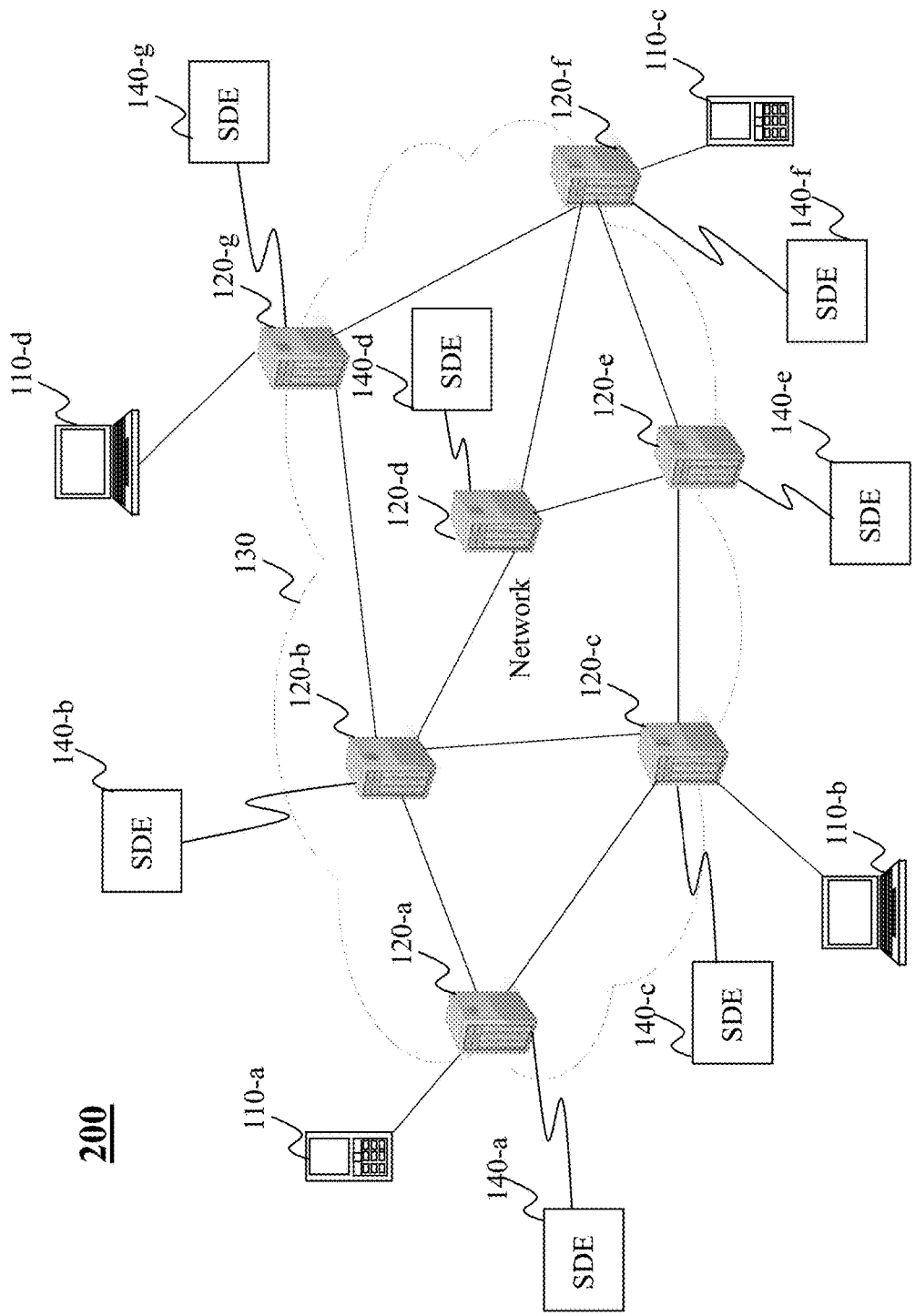
FIG. 2 depicts another operational configuration of a source determining engine, according to another embodiment of the present teaching.

In FIG. 2, an alternative configuration 200 is provided, in which each persistent storage device 120-a, 120-b, . . . 120-g, is connected to a corresponding SDE 140-a, 140-b, . . . 140-g. That is, in this embodiment, the SDE is a special module in the backend of the persistent storage device. Thus, each SDE is configured to determine whether the persistent data storage device associated with it is a source of truth with respect to a data object.

Figure 3:
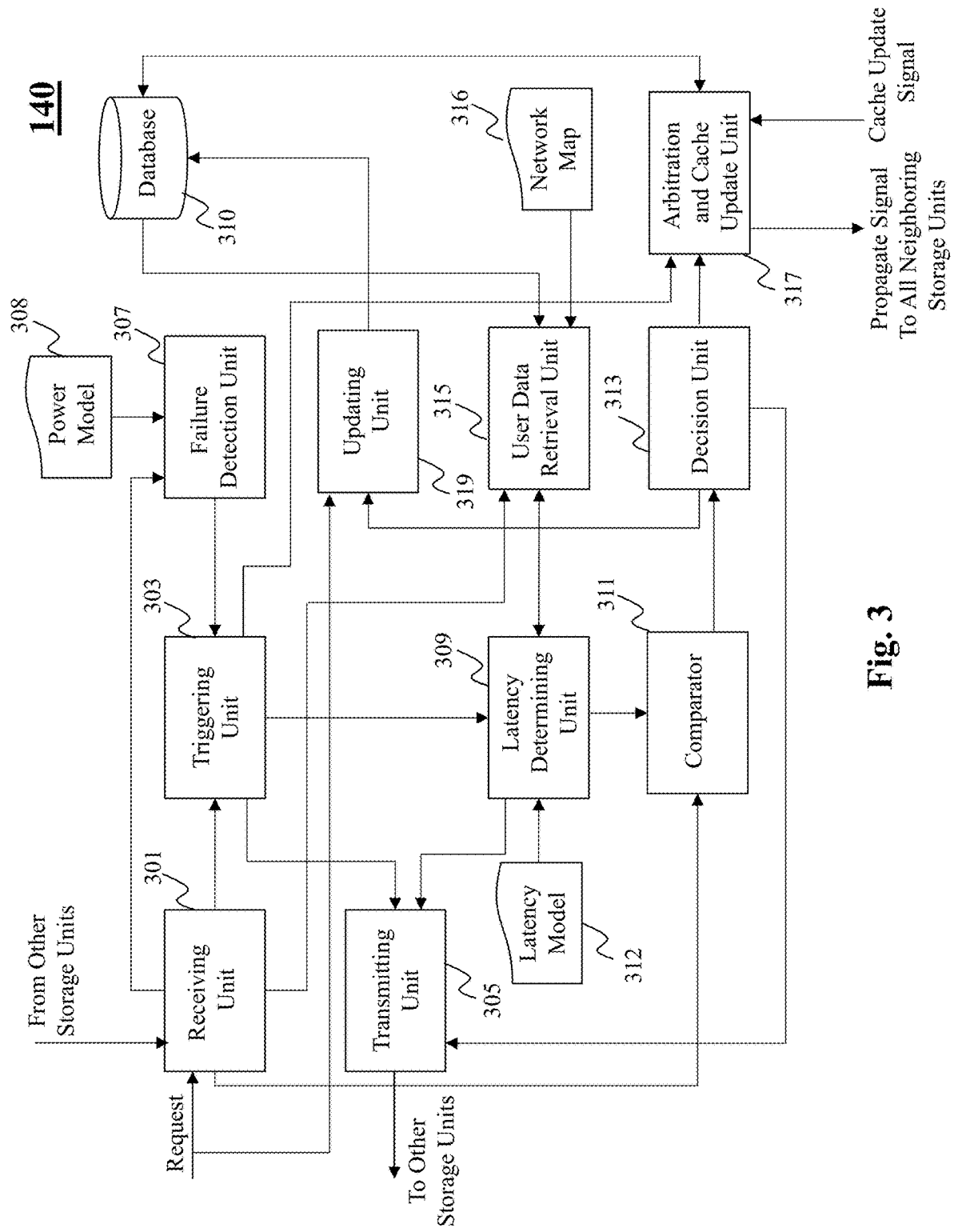
FIG. 3 depicts an exemplary high-level system diagram of a source determining engine, according to an embodiment of the present teaching.

FIG. 3 depicts an exemplary high-level system diagram of a SDE 140, according to an embodiment of the present teaching. It must be appreciated that the operation of the SDE as described herein is applicable to the configurations depicted in FIGS. 1 and 2, respectively. The SDE 140 includes a receiving unit 301, a triggering unit 303, a transmitting unit 305, a failure detection unit 307, a latency determining unit 309, a comparator 311, a decision unit 313, a user-data retrieval unit 315, an arbitration and cache update unit 317, and an updating unit 319. In the following description, operation of the SDE is described with respect to a first persistent data storage device (or alternatively referred to as a current persistent data storage device) that hosts the data object, whereas the remaining persistent data storage devices are referred to as other persistent storage devices. It must be appreciated that the other persistent storage devices may also have a copy of the data object under consideration.

The receiving unit 301 receives a user issued request to access a data object stored in the current persistent storage device. Such a request may correspond to a request to perform a read operation of the data object, a request to modify/update the data object, etc. The received request is transmitted to the triggering unit 303. The triggering unit 303 in turn activates the latency determining unit 309 and the transmitting unit 305. As stated previously, the SDE is configured to determine, for each request, whether the current persistent data storage device is the source of truth with respect to the data object.

The triggering unit 303 activates the latency determining unit 309 to compute an average latency of users (that have or are accessing the data object for which the current request is received) with respect to the current persistent data storage in accordance with a latency model 312. In order to compute the latency, the latency determining unit 309 requests the user data retrieval unit 315 for information pertaining to the users that have (or are) accessing the data object. Such information may correspond to the location of the users in the network, with respect to the current persistent storage device. Such information may be determined via the network map 316. Moreover, the user data retrieval unit 315 may fetch information pertaining to which user(s) have accessed a particular data object from the database 310. The user data retrieval unit 315 may provide such information to the latency determining unit 309, which thereafter may compute the average user latency (with respect to the current persistent storage device) based on the received information.

By one embodiment of the present teaching, the triggering unit 303 may also activate, upon receiving the request, the transmitting unit 305. The transmitting unit 305 may be configured to transmit a broadcast message to all other persistent storage devices, requesting information pertaining to the average latency of users with respect to each of the other persistent storage devices respectively. Such information is received by the receiving unit 301 from each of the other persistent storage devices, and further transmitted to the comparator 311.

The comparator 311 also receives latency information related to the current persistent storage device from the latency determining unit 309. The comparator is configured to compare the received latency information (i.e., compare the average latency information of users with respect to the current persistent storage device to the average latency information of users with respect to each of the other persistent storage devices). By one embodiment, the comparator 311 is configured to select the minimum average latency information i.e., determine the persistent storage device that has a lowest (i.e., minimum) average user latency associated with it and transmit such information to the decision unit 313.

The decision unit 313 is configured to activate the updating unit 319 in response to the current persistent storage device having the lowest average user latency. Thereafter, the updating unit 319 retrieves the request and grants access to the data object stored in the database 310 associated with the current persistent storage device. For example, the updating unit 319 may retrieve the data object from the database 310 and provide the data object to the user (who issued the request) to perform a read operation, an update/modify operation, and the like.

According to one embodiment, the decision unit 313 is also configured to provide a notification result of the comparison of the latency information to other persistent storage devices. Accordingly, the decision unit 313 may transmit, via the transmitting unit 305, a broadcast message to the other persistent storage devices informing them of the source of truth with respect to the data object. For example, if the current persistent storage device is determined as the source of truth, then the notification message serves as an indication to the other persistent storage devices that any request pertaining to the data object should be directed to the current persistent storage device. Alternatively, if it determined that one of the other persistent storage devices is the source of truth, then any requests that are issued by the users with respect to the data object, should be forwarded to the persistent storage device that has been determined as the source of truth with respect to the data object.

According to one embodiment, in response to determining that the current persistent storage unit is the source of truth with respect to a data object, the decision unit 313 may be configured to initiate the arbitration and cache update unit 317. The arbitration and cache update unit 317 updates the data object in the local cache of each neighboring (i.e., directly connected) other persistent storage device(s). In this manner, if a user later requests a read operation of the data object, the data object may be accessed via any one of the neighboring other persistent storage devices that is closer to the user. It must be appreciated that for the read request, the data object may be accessed via a cache of one of the neighboring persistent storage devices only if there no intermittent update requests of the data object. In a similar manner, if the current persistent storage device is a neighbor of one of the other persistent storage devices that has been deemed to the source of truth with respect to the data object, then the signal (i.e., cache update signal) to update the data object that is transmitted by the source of truth is received by the arbitration and cache update unit 317. The arbitration and cache update unit 317 thereafter updates the data object in its own database 310. Exemplary scenarios regarding the cache updates of the neighboring persistent storage devices are described later with reference to FIG. 5.

According to an embodiment of the present teaching, the SDE 140 includes the failure detection unit 307. The failure detection unit 307 is configured to determine an occurrence of failure event in the current persistent storage unit upon receiving a request. For example, the failure detection unit 307 may be configured to determine whether there is a power failure in the current persistent storage unit in accordance with a model 308. By one embodiment, upon detecting the failure event, the failure detection unit 307 activates the triggering unit 303, which may trigger the arbitration and cache update unit 317.

It must be appreciated that upon detecting a failure in the current persistent storage device, the latency determining unit may determine according to one embodiment, that the average user latency associated with the current persistent storage device is extremely high (e.g., infinity). Further, if the current persistent storage device was previously determined as a source of truth with respect to at least one data object, the arbitration and cache update unit 317 may be configured to assign one of the other persistent storage devices (e.g., a neighboring persistent storage device) as the new source of truth with respect to the at least one data object. The arbitration and cache update unit 317 may implement various arbitration schemes in order to determine the new source of truth. Details regarding the arbitration mechanisms are described next with reference to FIG. 8.

Figure 4:
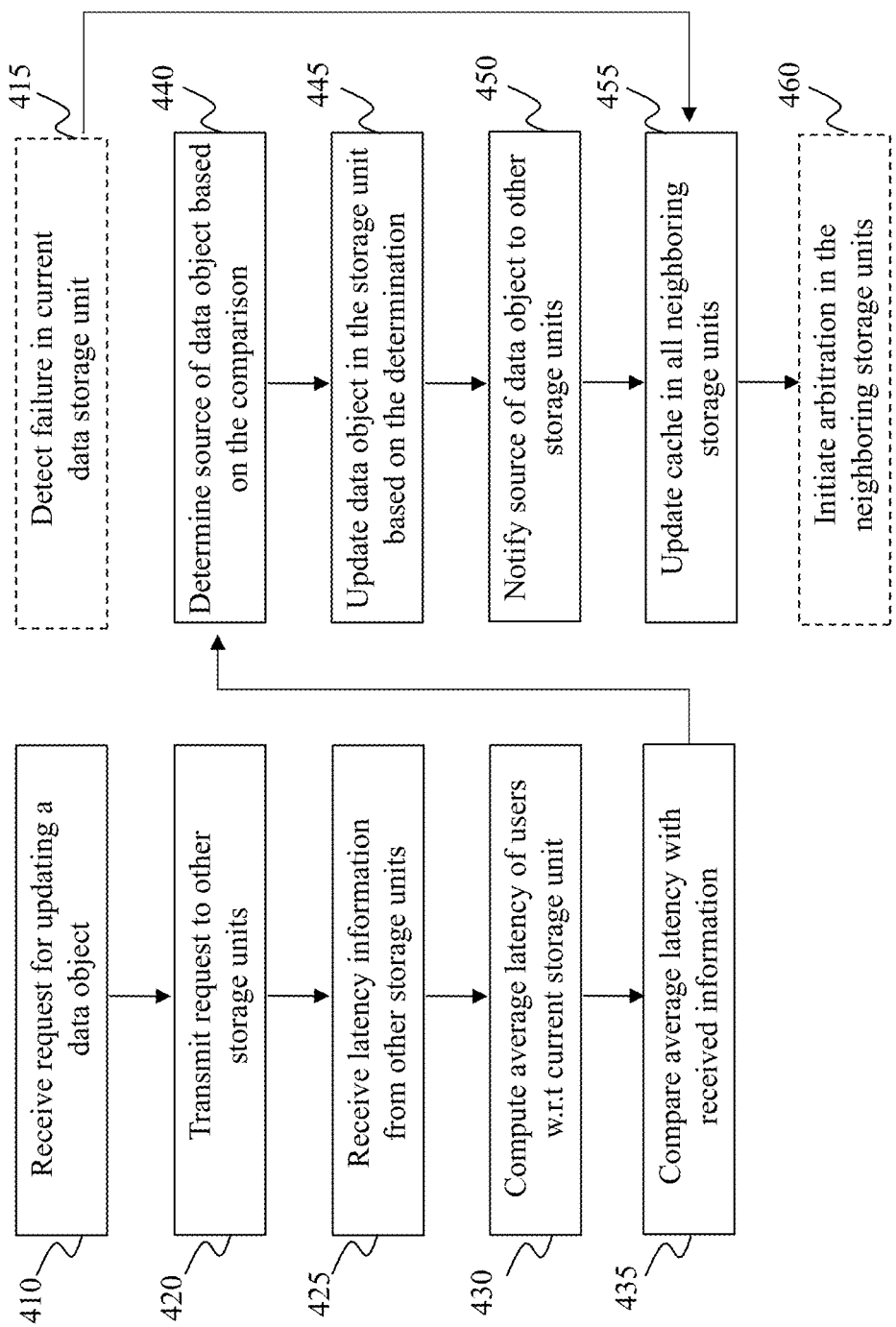
FIG. 4 is a flowchart of an exemplary process of a source determining engine, according to an embodiment of the present teaching.

Turning now to FIG. 4, there is depicted a flowchart of an exemplary process of a source determining engine (SDE), according to an embodiment of the present teaching. The process commences in step 410, wherein a request is received to perform an operation (e.g., an update/modify) with respect to a data object. It must be appreciated that the request, by one embodiment, may be received by the persistent storage data unit, which may thereafter transmit the request to the SDE in order to determine whether the persistent data storage unit is a source of truth with respect to the data object.

The process then moves to step 420, wherein the SDE transmits a request to other persistent storage units in order to obtain user latency information with regard to each of the other persistent storage devices. The user latency information is received in step 425.

In step 430, the SDE computes average latency of users with respect to the current persistent storage device. Thereafter, in step 435, the SDE compares the computed average latency information (of step 430), with the user latency information associated with each of the other persistent storage devices is receives (step 425).

The process then moves to step 440, wherein the SDE determines a source of truth of the data object based on the comparison. Specifically, the SDE identifies one of the persistent storage devices as being the source of truth with respect to the data object. In response to the current persistent storage device being determined as the source of truth, the SDE in step 445, updates the data object.

The process in step 450 notifies other persistent storage units that the current persistent storage unit is the source of truth with respect to the data object. Thereafter, in step 455, the SDE updates the cache in all neighboring (i.e., directly connected) persistent storage devices. As shown in FIG. 4, the process as implemented by the SDE may also include the step of 415, wherein the SDE detects occurrence of a failure event in the current persistent storage device. Thereafter, based on successfully detecting a failure event, the process moves to step 455 to update the cache of the neighboring devices. Thereafter, in step 460, the SDE may perform an arbitration process to determine which one of the other persistent storage devices is to be assigned as the new source of truth with respect to the data object.

Figure 5:
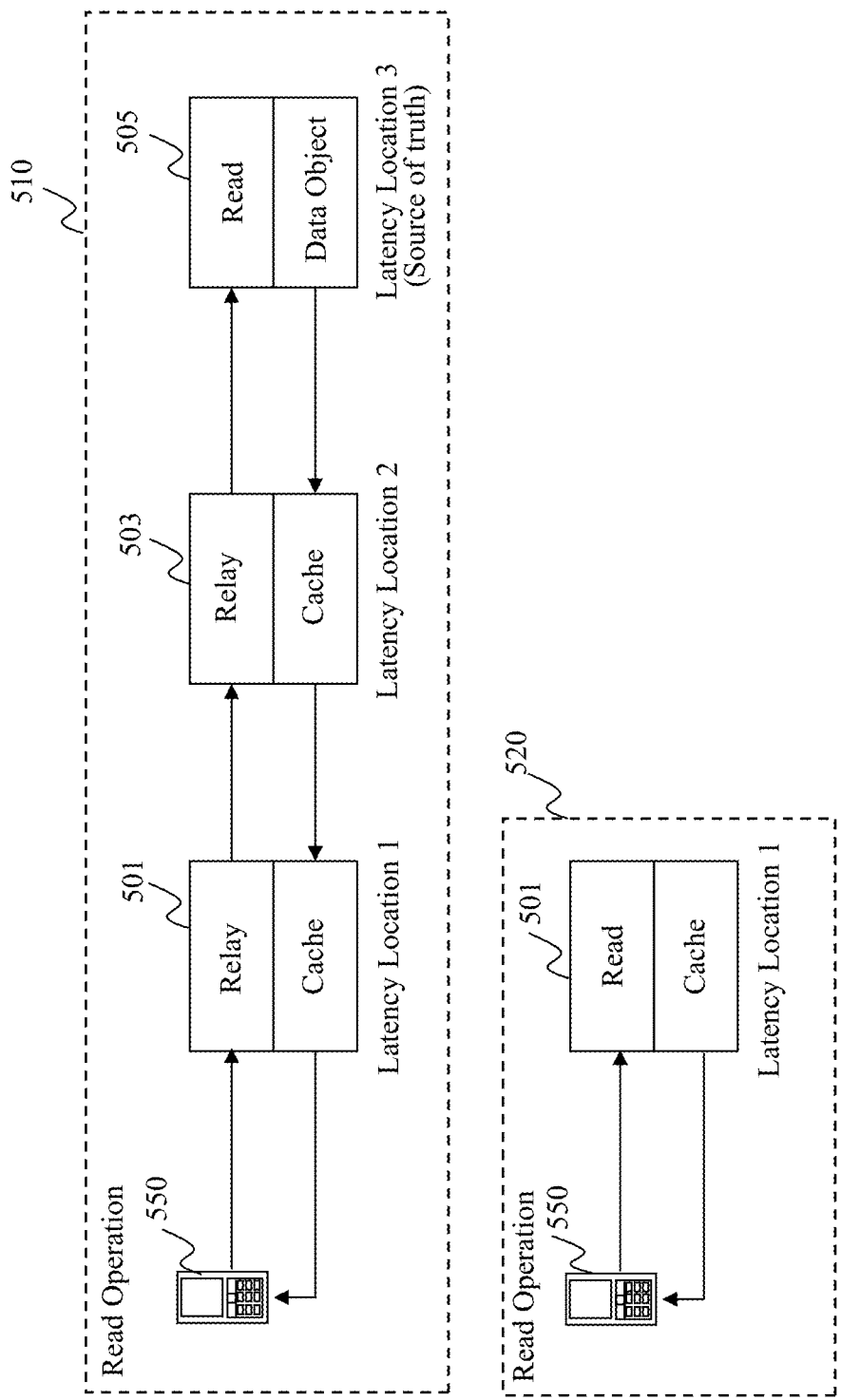
FIG. 5 depicts a schematic illustrating a read operation, according to an embodiment of the present teaching.

FIG. 5 depicts a schematic illustrating read operations of a data object performed by a user, according to an embodiment of the present teaching. In FIG. 5, a first read operation performed by a user 550 with respect to a data object is represented as 510. As shown in FIG. 5, a persistent storage device that is the source of truth with respect to the data object is the storage device 505 located at latency location 3. As it is the first time the user is performing a read operation, the data object is accessed from latency location 3. Thus, the user's read operation request is routed via relays included in the storage devices 501 and 503, at latency locations 1 and 2 respectively, to the persistent storage device 505 at latency location 3.

Further, as shown in FIG. 5, upon accessing the data object from the persistent storage device 505 at latency location 3, the data object is successively cached (in the local memory) at storage devices at latency locations 2 and 1, respectively. The caching of the data object at the storage devices located at latency locations 2 and 1 provides for the following advantage. If the user 550 issues another subsequent read operation (labeled 520) with respect to the same data object, the user 550 can access the data object from the persistent storage device 501 at latency location 1. In this manner, although the persistent storage device 505 at latency location 3 is the source of truth with respect to the data object, the data object can be accessed from the persistent storage device 501 at latency location 1, thereby reducing access time for the user. It must be appreciated that the subsequent read operation can access the data object from the persistent storage device 501 at latency location 1 under the assumption there were no intermediate update operations with respect to the data object between the successive read operations. However, if the data object is updated after the first read operation, the user 550 accesses the data from the persistent storage device that is the source of truth with respect to the data object, which may be at latency location 3 or any other dynamically determined latency location based on other user's access patterns.

Figure 6A:
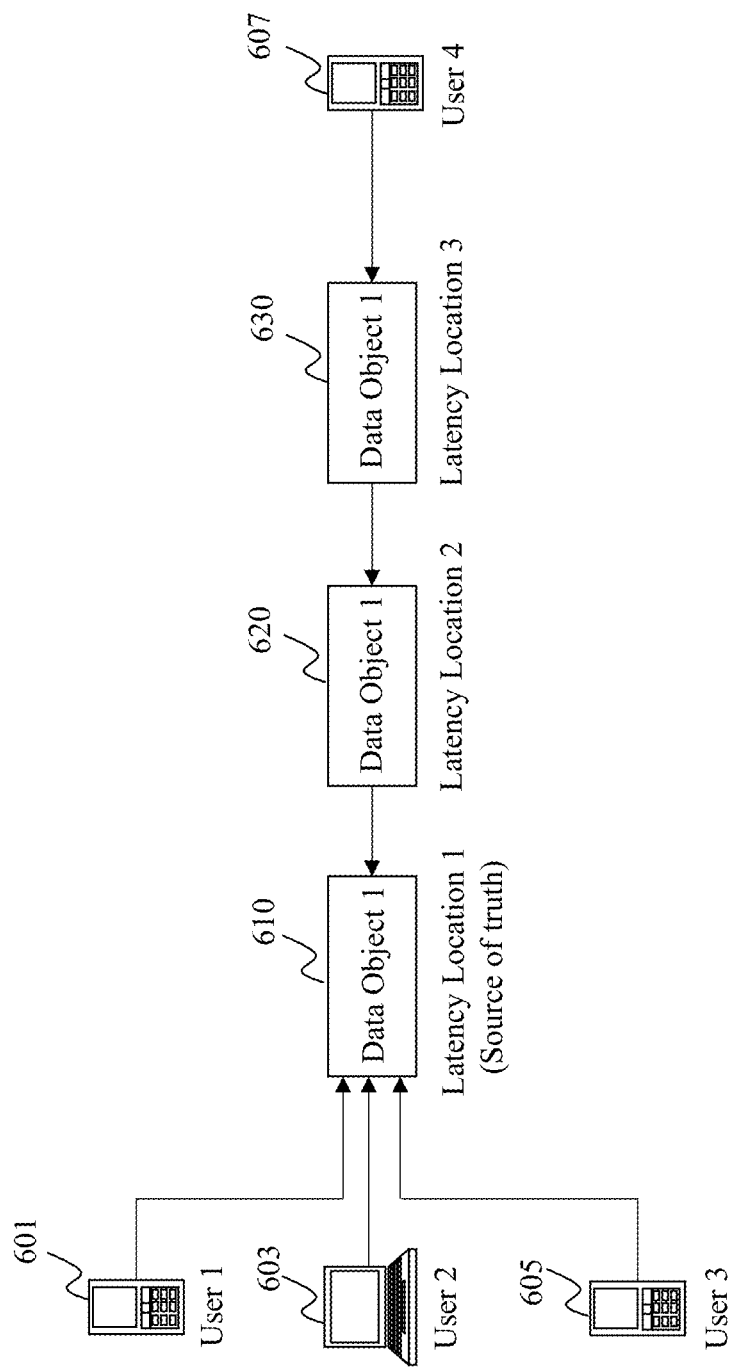
FIGS. 6A-6C depict schematics illustrating an update operation, according to various embodiments of the present teaching.
Figure 6B:
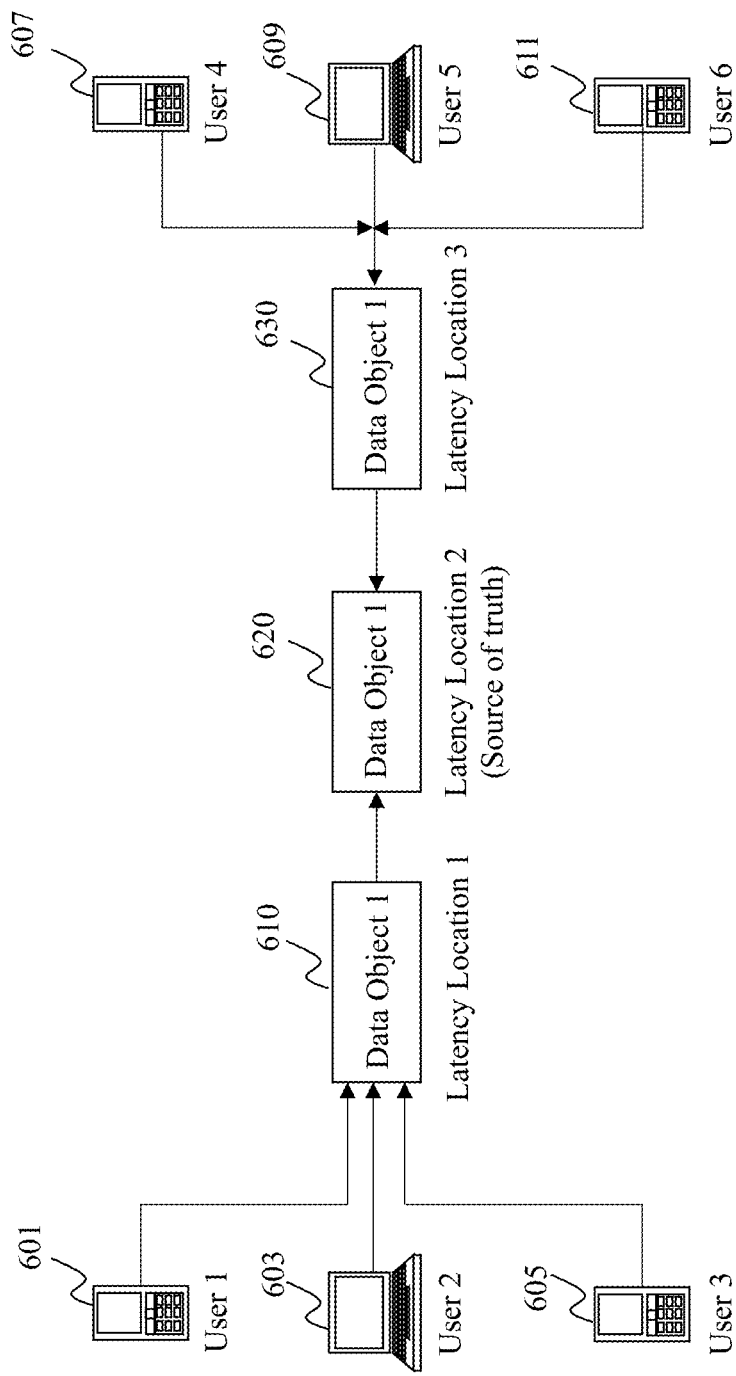
Figure 6C:
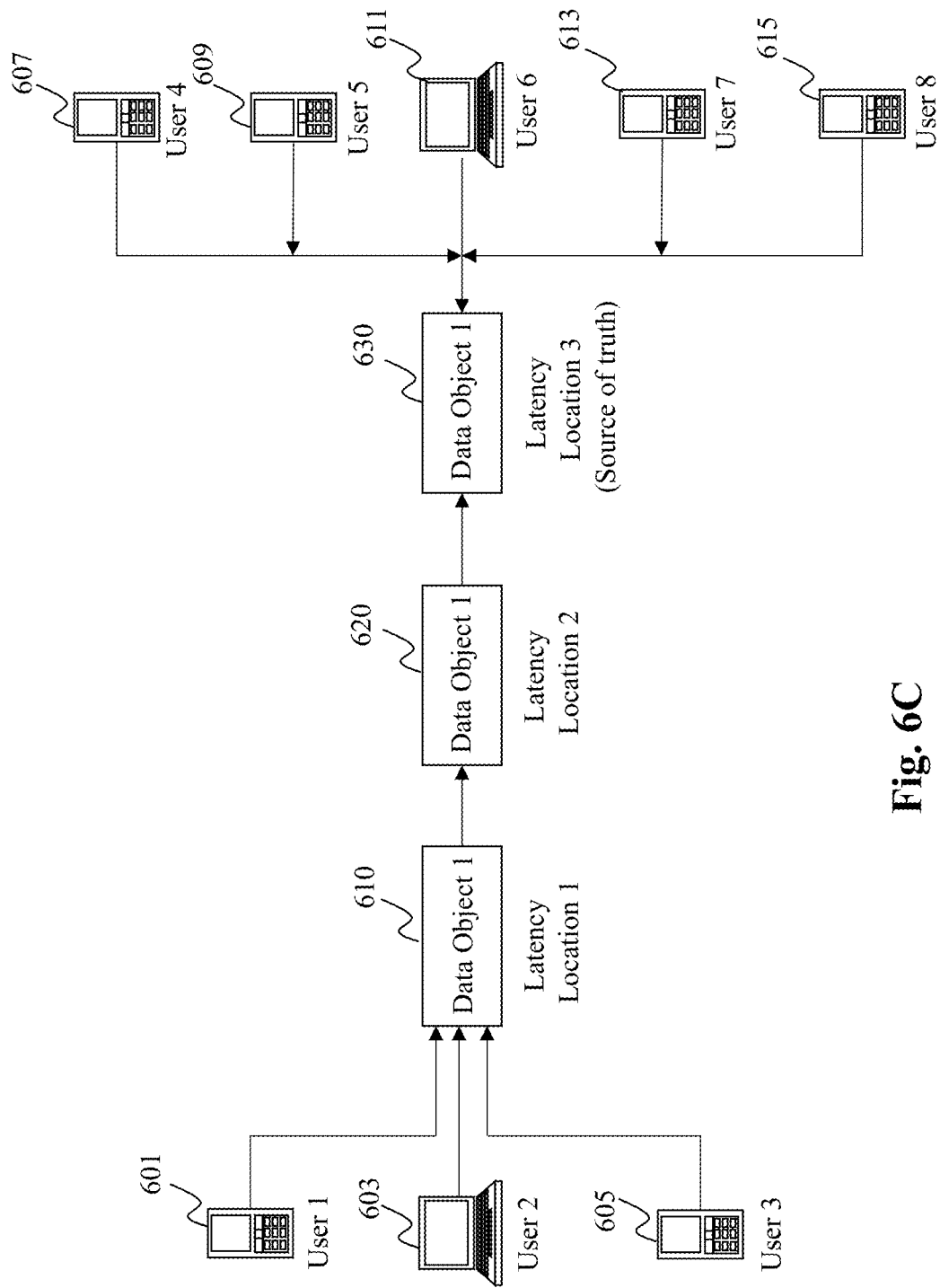

FIGS. 6A-6C depict schematics illustrating a series of update operations, according to various embodiments of the present teaching. As shown in FIG. 6A, data object 1 resides in three persistent storage devices 610, 620, and 630, which are located at latency locations 1, 2, and 3, respectively. Further, consider the case where users 601, 603, 605, and 607 are the respective users that intend on accessing data object 1 to perform for instance, an update operation. In this case, the SDE may determine that the persistent storage device 610 at latency location 1 is to be identified as the source of truth with respect to data object 1, as the average latency incurred by users 601, 603, 605, and 607 in accessing data object 1 from the persistent storage device may be minimum.

Further, as stated previously, the SDE continuously determines in a dynamic manner, with respect to each data object, as to which persistent storage device is to be identified as the source of truth. Continuing from the scenario depicted in FIG. 6A, consider the case as depicted in FIG. 6B, where two additional users 609 and 611 intend on accessing the same data object (i.e., data object 1). In this case, as shown in FIG. 6B, the source of truth with respect to data object 1 is shifted from the persistent storage device 610 at latency location 1 to the persistent storage device 620 at latency location 2. This may occur as the SDE may determine that the average latency incurred by users (601, 603, 605, 607, 609, and 611) in accessing data object 1 may be the lowest when the data object is accessed from the persistent storage device 620 at latency location 2. In a similar manner, continuing from the scenario depicted in FIG. 6B, if more additional users e.g., users 613 and 615 as depicted in FIG. 6C request to access data object 1, the source of truth with respect to data object 1 shifts from the persistent storage device 620 at latency location 2 (as shown in FIG. 6B) to the persistent storage device 630 at latency location 3 as shown in FIG. 6C. Thus, according to the teachings of the present disclosure, the SDE dynamically determines, for each data object, the persistent storage device that acts as a source of truth in a manner such that average latency of the users in accessing the data object is minimized.

Figure 7:
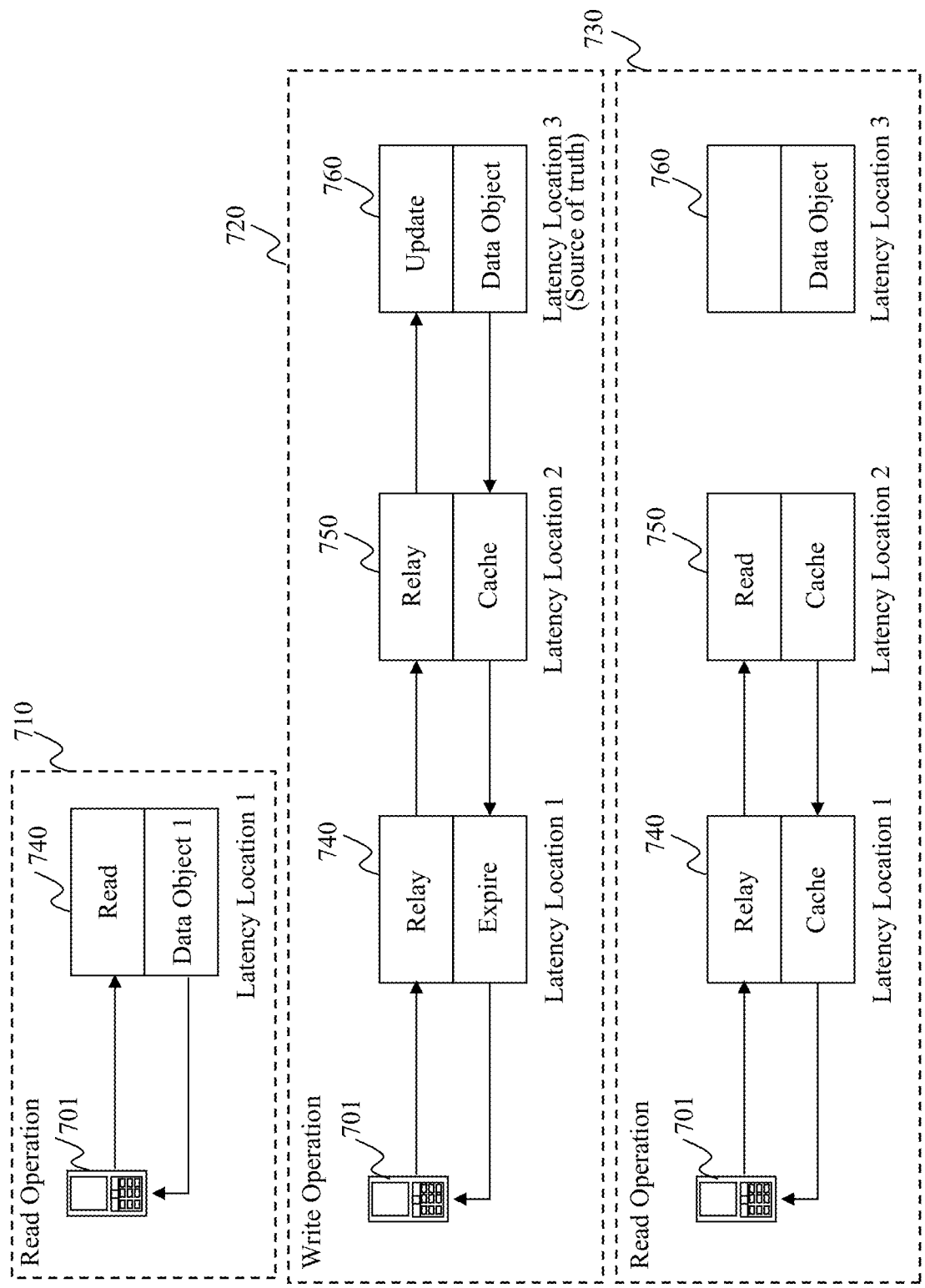
FIG. 7 depicts a schematic illustrating a sequence of operations performed on a data object, according to an embodiment of the present teaching.

Turning now to FIG. 7, there is depicted another schematic illustrating a sequence of operations performed on a data object, according to an embodiment of the present teaching. For sake of simplicity, a linear network of three persistent storage devices 740, 750, and 760, located at latency location 1, latency location 2, and latency location 3, respectively, is considered.

As shown in FIG. 7, a read operation 710 is first performed by user 701 with respect to data object 1. It must be appreciated that the data object 1 is accessed from the persistent storage device at latency location 1. Note that even though the persistent storage device at latency location 3 is a source of truth with respect to data object 1, user 701 reads the data object 1 from the cache of the persistent storage device 740 at latency location 1. This occurs under the presumption that the user 701 may have previously requested a read operation of data object 1, which was subsequently cached at the persistent storage device 740 at latency location 1, and that data object 1 was not updated between the read operations.

Further, as shown in FIG. 7, operation labeled 720 corresponds to the user 701 initiating an update operation with respect to data object 1. In this case, user 701 accesses (and updates) the data object 1 from the persistent storage device 760 at latency location 3, via the relays included in the persistent storage devices 740 and 750, respectively. Moreover, as the persistent storage device 750 at latency location 2 is a direct neighbor of the persistent storage device 760 at latency location 3 (i.e., the source of truth with respect to data object 1), SDE of the present teaching updates the local cache of the persistent storage device 750 at latency location 2 with the updated data object 1. Additionally, the direct neighbors of the source of truth i.e., persistent storage device 750, make void i.e., expire the cache of their neighbors (i.e., the persistent storage device 740). In doing so, the present teaching achieves the advantageous ability of notifying the user that the cache at the persistent storage device to which the user is directly connected to (i.e. storage device 740) is invalid, as the data object has been updated subsequent to the previous read operation issued by the user.

Further, as shown in FIG. 7, when the user issues a second read operation 730, the user does not require to access the data object from the source of truth i.e., the persistent storage device 760 at latency location 3. Rather, the user can access the data object from the direct neighbor 750 at latency location 2. It must be appreciated that upon the data object 1 being accessed from latency location 2 (i.e., during the second read operation 730), the data object also gets cached at the persistent storage device 740 at latency location 1. Thus, in case the user performs another read operation subsequent to read operation 730, the data object will be accessed from the persistent storage device at latency location 1, assuming that data object 1 was not updated in the interim.

Figure 8A:
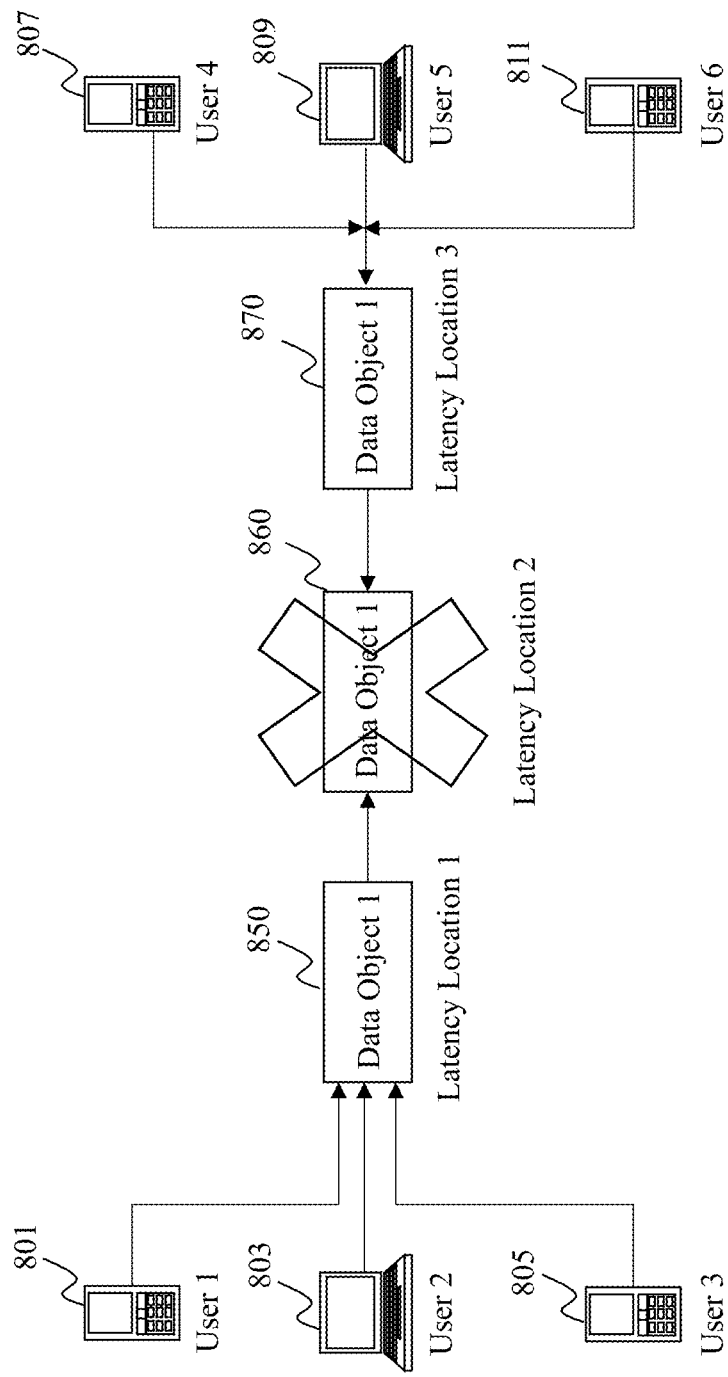
FIGS. 8A-8B depict an exemplary handoff operation, in accordance with an embodiment of the present teaching.
Figure 8B:
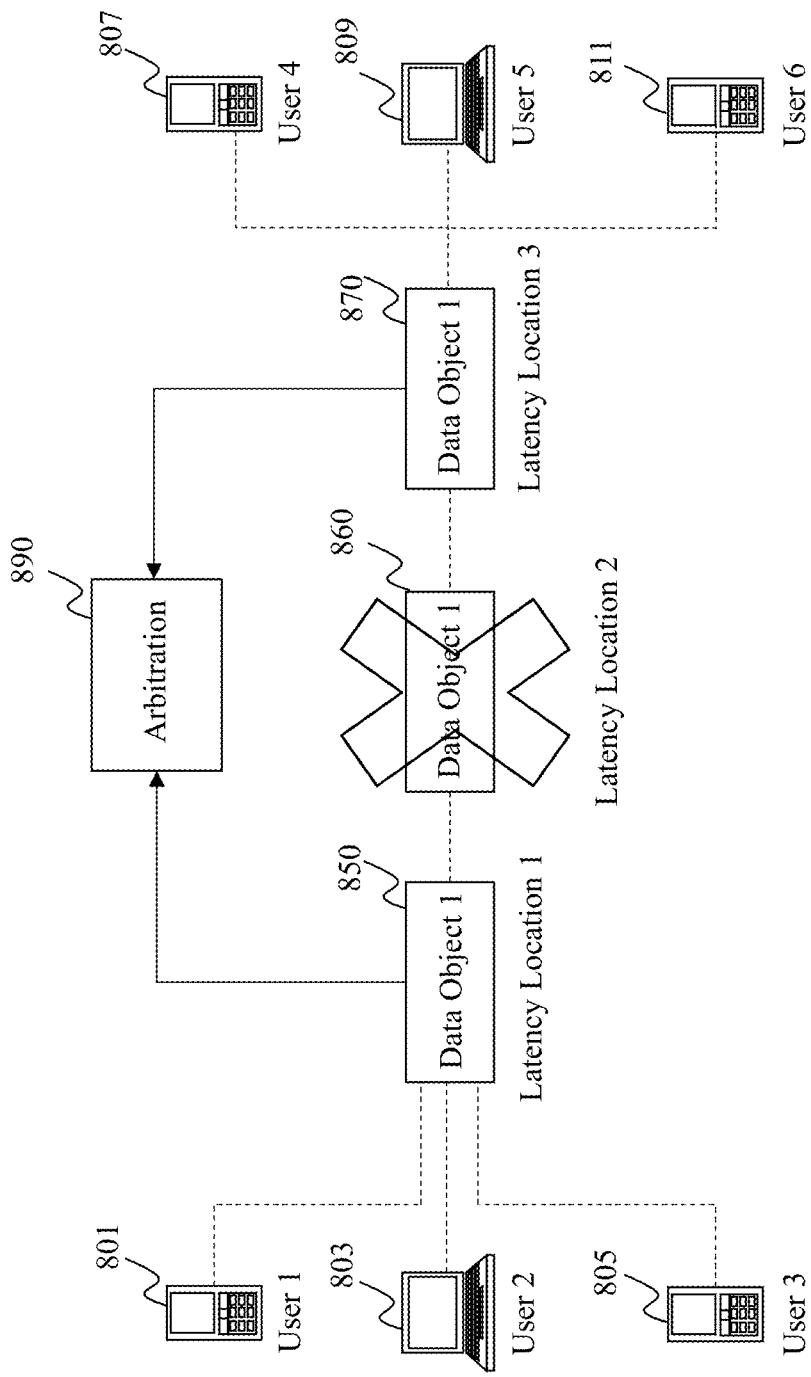

FIGS. 8A-8B depict an exemplary handoff operation, in accordance with an embodiment of the present teaching. As stated previously with reference to FIG. 3, the SDE of the present teaching monitors for failure occurrences in a persistent data storage device. Upon occurrence of a failure, the SDE assigns another persistent storage device as the new source of truth with respect to the data object.

FIG. 8A depicts a scenario wherein the persistent data storage device 860 at latency location 2 is a source of truth with respect to data object 1. Accordingly, users 801, 803, 805, 807, 809, and 811 access data object 1 from the persistent data storage device 860 at latency location 2. In the case that the SDE determines an occurrence of a failure event (e.g., power loss) related to the persistent data storage device 860 at latency location 2, the arbitration and cache update unit 317 (shown in FIG. 3) included in the SDE initiates an arbitration process 890 as shown in FIG. 8B.

By one embodiment of the present teaching, the SDE may select one of the direct neighbors of the persistent storage device to be the new source of truth based on computing average user latency with respect to the direct neighbors. For example, the SDE may assign the direct neighbor which minimizes the average user latency to be the new source of truth with respect to the data object. In the case of more than one neighboring persistent storage device having the same (i.e., minimum) average user latency, the SDE may implement an arbitration policy that randomly selects one of the neighboring persistent storage devices to be the new source of truth with respect to the data object. For instance, referring to FIG. 8B, upon detecting the occurrence of a failure event at the persistent storage device 860 (i.e., the original source of truth), the SDE may select one of the persistent data storage devices 850 and 870 (having the same average user latency) that are direct neighbors of the persistent storage device 860, to be the new source of truth with respect to data object 1.

Furthermore, by another embodiment of the present teaching, the SDE may implement an arbitration policy to select the new source of truth in accordance with at least an additional arbitration criterion. For example, in addition to the above described arbitration schemes, the SDE may select one of the neighboring persistent storage devices as the new source of truth based on a number of other data objects for which the neighboring persistent storage devices serve as the source of truth. More specifically, the SDE may select the neighboring persistent storage device that is a source of truth for fewer other data objects. In this manner, the SDE achieves load balancing by assigning different persistent storage devices to be the source of truth with respect to different data objects.

Figure 9:
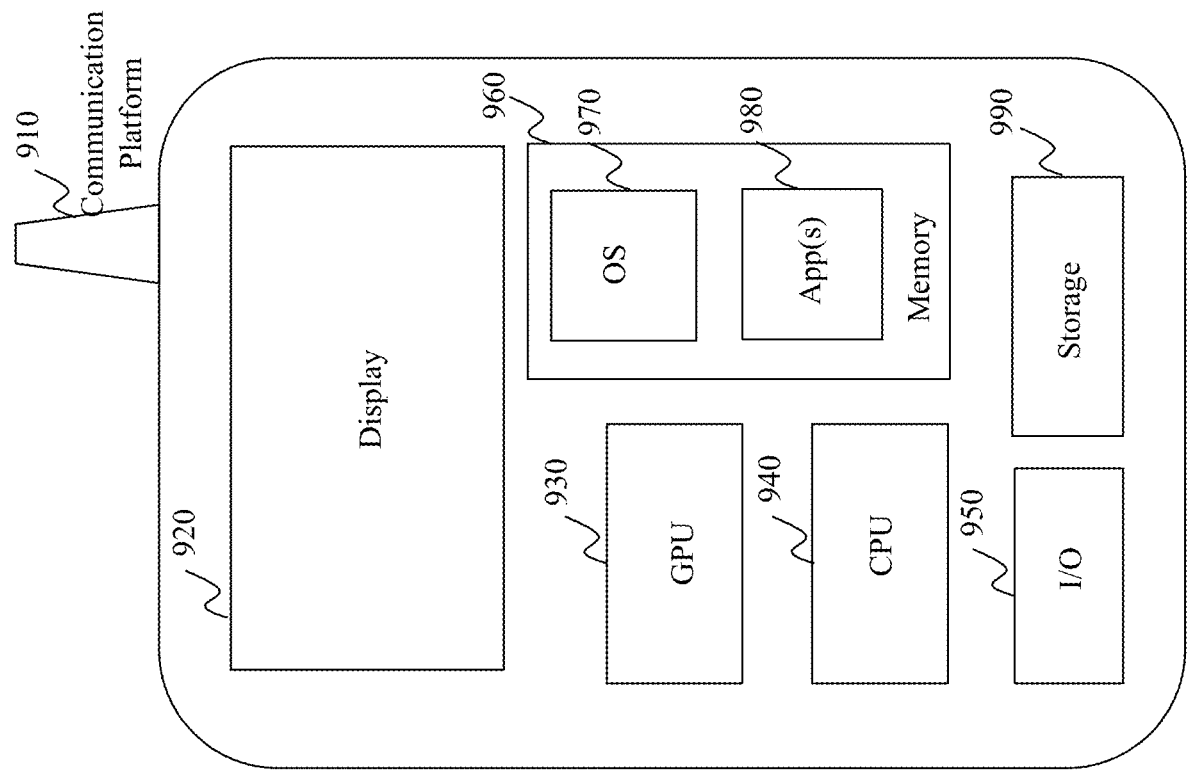
FIG. 9 depicts an architecture of a mobile device which can be used to implement a specialized system incorporating the present teaching.

Turning now to FIG. 9, there is depicted an architecture of a mobile device 900, which can be used to realize a specialized system implementing the present teaching. In this example, a user device on which the functionalities of the various embodiments described herein can be implemented is a mobile device 900, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 900 in this example includes one or more central processing units (CPUs) 940, one or more graphic processing units (GPUs) 930, a display 920, a memory 960, a communication platform 910, such as a wireless communication module, storage 990, and one or more input/output (I/O) devices 950. Any other suitable component, including but not limited to a system bus or a controller (not shown), may also be included in the mobile device 900. As shown in FIG. 9, a mobile operating system 970, e.g., iOS, Android, Windows Phone, etc., and one or more applications 980 may be loaded into the memory 960 from the storage 990 in order to be executed by the CPU 940. The applications 980 may include a browser or any other suitable mobile apps for performing the various functionalities on the mobile device 900. User interactions with the content displayed on the display panel 920 may be achieved via the I/O devices 950.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 10:
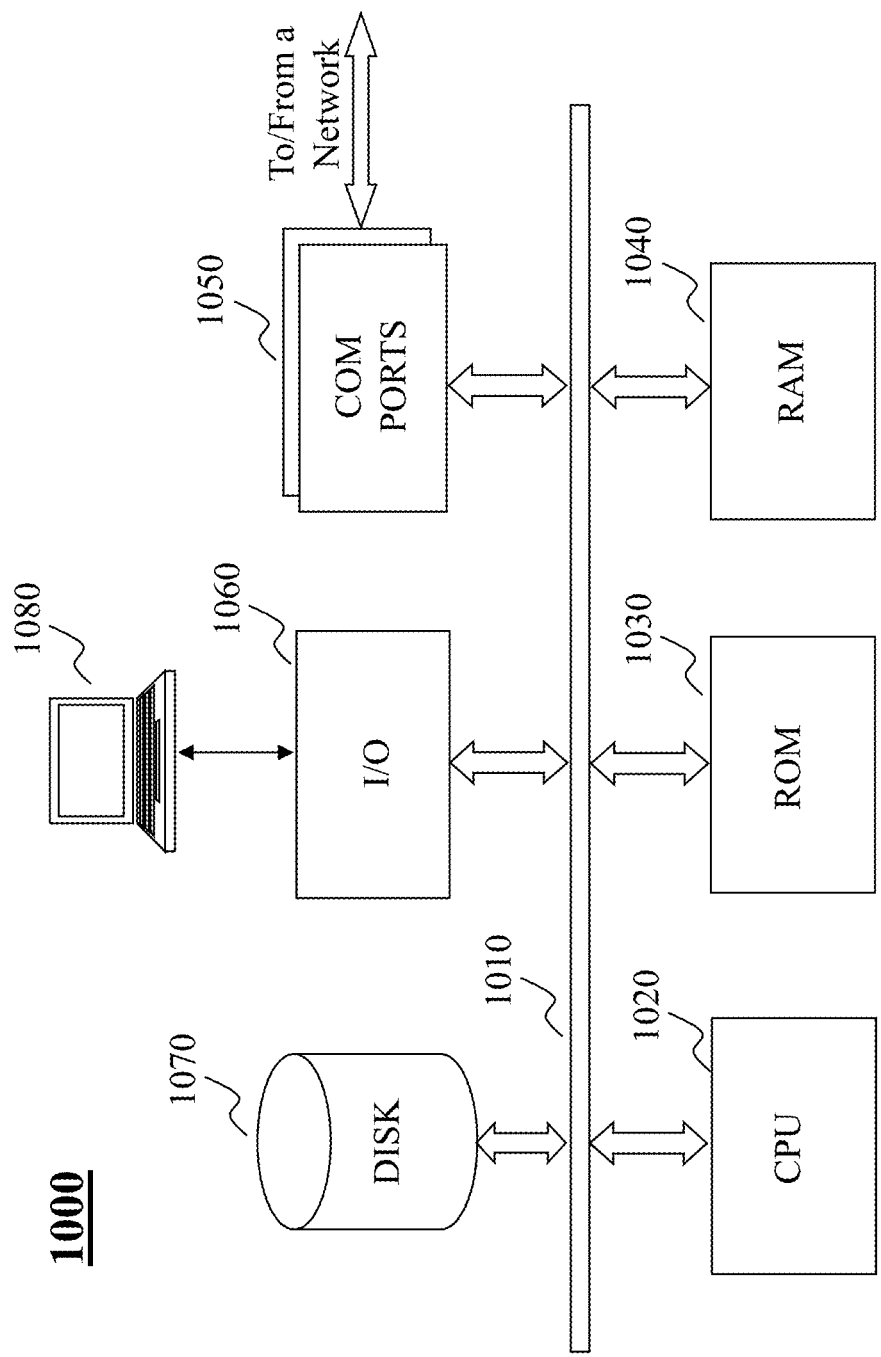
FIG. 10 depicts the architecture of a computer which can be used to implement a specialized system incorporating the present teaching.

FIG. 10 is an illustrative diagram of an exemplary computer system architecture, in accordance with various embodiments of the present teaching. Such a specialized system incorporating the present teaching has a functional block diagram illustration of a hardware platform which includes user interface elements. Computer 1000 may be a general-purpose computer or a special purpose computer. Both can be used to implement a specialized system for the present teaching. Computer 1000 may be used to implement any component(s) described herein. For example, the present teaching may be implemented on a computer such as computer 1000 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1000, for example, may include communication ports 1050 connected to and from a network connected thereto to facilitate data communications. Computer 1000 also includes a central processing unit (CPU) 1020, in the form of one or more processors, for executing program instructions. The exemplary computer platform may also include an internal communication bus 1010, program storage and data storage of different forms (e.g., disk 1070, read only memory (ROM) 1030, or random-access memory (RAM) 1040), for various data files to be processed and/or communicated by computer 1000, as well as possibly program instructions to be executed by CPU 1020. Computer 1000 may also include an I/O component 1060 supporting input/output flows between the computer and other components therein such as user interface elements 1080. Computer 1000 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the source determining engine into the hardware platform(s) of a computing environment or other system implementing a computing environment or similar functionalities in connection with source node determination (i.e., determining a source of truth of a data object). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the source determining engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having at least one processor, storage, and a communication platform capable of connecting to a network for determining a source of a data object, the method comprising:
computing, with respect to a first data source, a first average latency of a plurality of users in accessing the data object from the first data source, wherein the first data source was previously identified as being the source of the data object;
obtaining, from each of other data sources, a second average latency of the plurality of users in accessing the data object from the other data source;
in response to the first data source satisfying a first criterion associated with the first average latency,
maintaining the first data source to be the source of the data object; and
in response to the first data source violating the first criterion,
determining one of the other data sources to be the source of the data object based on a second criterion with respect to the second average latency as well as a number of additional data objects for which the one of the other data sources was previously identified as the source of the additional data objects.

2. The method of claim 1, wherein the first criterion corresponds to the first average latency being lower than the second average latency, and the first data source being active.

3. The method of claim 1, wherein the second criterion associated with the one of the other data sources corresponds to the one of the other data sources being active and the second average latency associated with the one data source being lowest among the other data sources.

4. The method of claim 1, wherein determining the source of the data object is initiated in response to receiving, from at least one user, a request to perform an operation on the data object.

5. The method of claim 4, further comprising:
modifying, in response to the first data source being maintained as the source of the data object, the data object based on the request; and
updating a cache in each of the other data sources that are directly connected to the first data source based on the modified data object.

6. The method of claim 4, wherein the determining of the source of the data object is initiated based on at least one of a type of operation that is to be performed on the data object and a timing of performing the operation.

7. A non-transitory computer readable medium including computer executable instructions, wherein the instructions, when executed by a computer, cause the computer to perform a method for determining a source of a data object, the method comprising:
computing, with respect to a first data source, a first average latency of a plurality of users in accessing the data object from the first data source, wherein the first data source was previously identified as being the source of the data object;
obtaining, from each of other data sources, a second average latency of the plurality of users in accessing the data object from the other data source;
in response to the first data source satisfying a first criterion associated with the first average latency,
maintaining the first data source to be the source of the data object; and
in response to the first data source violating the first criterion,
determining one of the other data sources to be the source of the data object based on a second criterion with respect to the second average latency as well as a number of additional data objects for which the one of the other data sources was previously identified as the source of the additional data objects.

8. The medium of claim 7, wherein the first criterion corresponds to the first average latency being lower than the second average latency, and the first data source being active.

9. The medium of claim 7, wherein the second criterion associated with the one of the other data sources corresponds to the one of the other data sources being active and the second average latency associated with the one data source being lowest among the other data sources.

10. The medium of claim 7, wherein determining the source of the data object is initiated in response to receiving, from at least one user, a request to perform an operation on the data object.

11. The medium of claim 10, wherein the method further comprises:
 modifying, in response to the first data source being maintained as the source of the data object, the data object based on the request; and
 updating a cache in each of the other data sources that are directly connected to the first data source based on the modified data object.

12. The medium of claim 10, wherein the determining of the source of the data object is initiated based on at least one of a type of operation that is to be performed on the data object and a timing of performing the operation.

13. A system for determining a source of a data object, the system comprising:
 at least one processor configured for:
 computing, with respect to a first data source, a first average latency of a plurality of users in accessing the data object from the first data source, wherein the first data source was previously identified as being the source of the data object;
 obtaining, from each of other data sources, a second average latency of the plurality of users in accessing the data object from the other data source;
 in response to the first data source satisfying a first criterion associated with the first average latency,
 maintaining the first data source to be the source of the data object; and
 in response to the first data source violating the first criterion,
 determining one of the other data sources to be the source of the data object based on a second criterion with respect to the second average latency as well as a number of additional data objects for which the one of the other data sources was previously identified as the source of the additional data objects.

14. The system of claim 13, wherein the first criterion corresponds to the first average latency being lower than the second average latency, and the first data source being active.

15. The system of claim 13, wherein the second criterion associated with the one of the other data sources corresponds to the one of the other data sources being active and the second average latency associated with the one data source being lowest among the other data sources.

16. The system of claim 13, wherein determining the source of the data object is initiated in response to receiving, from at least one user, a request to perform an operation on the data object.

17. The system of claim 16, wherein the at least one processor is further configured for:
 modifying, in response to the first data source being maintained as the source of the data object, the data object based on the request; and
 updating a cache in each of the other data sources that are directly connected to the first data source based on the modified data object.

18. The system of claim 17, wherein the determining of the source of the data object is initiated based on at least one of a type of operation that is to be performed on the data object and a timing of performing the operation.

* * * * *